Dec. 22, 1959

F. B. HILLS

CONTROL MEANS

Filed Aug. 31, 1955

2,917,944

INVENTOR.
Fielding B. Hills
BY Morris Rabkin
ATTORNEY.

2,917,944

CONTROL MEANS

Fielding B. Hills, Atco, N.J., assignor to Radio Corporation of America, a corporation of Delaware Application August 31, 1955, Serial No. 531,733

The terminal fifteen years of the term of the patent to be granted has been disclaimed 4 Claims. (Cl. 74—526)

This invention relates to control means, and more particularly to a safety stop for a control member suitable for use in magnetic recording apparatus.

In magnetic recording systems, means are provided for controlling the apparatus comprised in the system to function either as a signal recording instrument or as a signal reproducing instrument. When the apparatus is conditioned to record signals on a magnetic tape, it is usual that whatever signal appears on the tape prior to the recording station is erased in order to condition the tape to receive the new signals. It is apparent that such erasing feature is not operative whenever the apparatus is conditioned for the reproduction of signals from a tape record. If, through inadvertence, the apparatus is conditioned to record when it is desired to condition the apparatus to reproduce, there is the possibility that a valued and irreplaceable record may be destroyed by erasure. When such apparatus is controlled by push buttons or the like, it is a relatively simple matter to inadvertently push the wrong push button.

Accordingly, it is an object of the present invention to provide an improved control member such as a push button which features means to prevent the inadvertent operation thereof.

It is another object of the present invention to provide an improved control member of the type set forth which is characterized in that means are provided to call the operator's attention to the particular push button encountered by the finger.

It is a further object of the present invention to provide an improved control member, as set forth, which is further characterized in that means are provided for preventing the operation thereof without first effecting a disabling of the preventing means.

In accomplishing these and other objects, there has been provided, in accordance with the present invention, a push button type control member wherein a lever is carried within the contour of the push button and extends through the surface of the push button, which surface is normally engaged by the finger of an operator. The lever is spring biased into a position to prevent the operation of the control member. The lever may be moved by the operator to a position where operation of the control member is not impeded.

A better understanding of the present invention may be had from the following detailed description when read in connection with the accompanying drawing in which.

Figure 1:
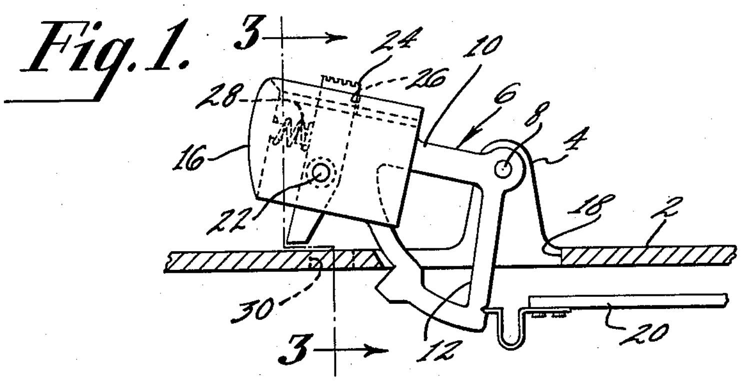
Fig. 1 is a fragmentary view, partially in cross section, of apparatus incorporating a control member embodying the present invention and showing the member in its unoperated condition.

Referring now to the drawing in more detail, there is shown a mounting panel 2 having a boss 4 projecting therefrom. A control operating lever 6 is pivotally secured to the boss 4 by means of a pivot 8. The control lever 6 includes a first part, which comprises the handle 10 of the lever, and an operating part 12. The handle portion 10 extends above the mounting panel 2 in a position to be engaged by a finger 14 of an operator. This portion is enclosed in an ornamental cap 16 which may be made of a suitable plastic material. The operating part extends below the mounting panel 2, through a suitable opening 18 in the mounting panel, to engage a member 20 which is to be actuated. This arrangement constitutes a control member which may be operated by being depressed by the finger of an operator. These are known generally as push button controls.

Figure 2:
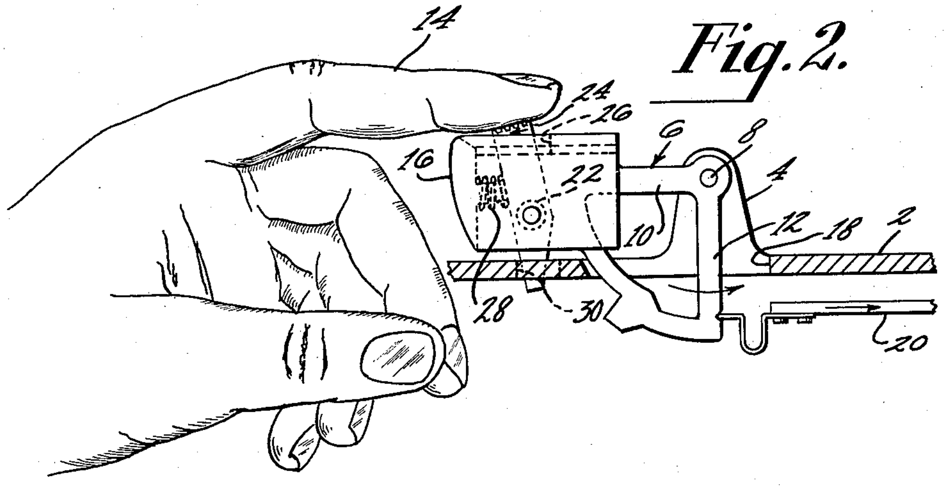
Fig. 2 is a view similar to that shown in Fig. 1, but showing the member in its operated condition.
Figure 3:
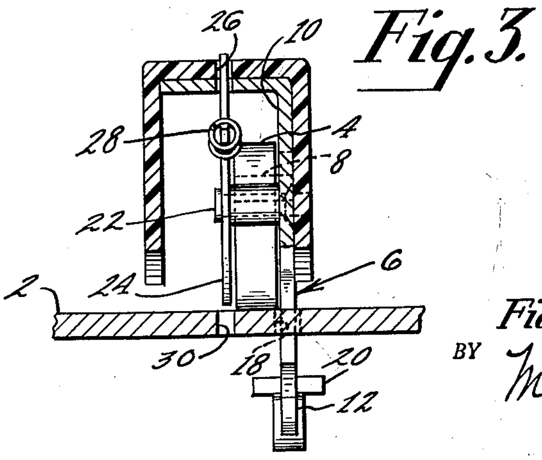
Fig. 3 is a cross sectional view taken along the line 3—3 of Fig. 1 as viewed in the direction of the arrows.

A stud 22 extends outwardly from the end portion of the handle 10 on the operating lever 6. A stop lever 24 is pivotally mounted on the stud 22. The upper end of the stop lever 24 extends through an elongated hole 26 ending in the upper surface of the handle 10 and cap 16 in a position to be engaged by the finger 14 of the operator. This upper end of the stop lever 24 is serrated to provide a distinctive identifying touch sensation field when touched by the operator and also to provide effective traction between the finger 14 and the stop lever 24 so that it may be moved against the force of a biasing spring 28 as shown in Fig. 2.

The lower end of the stop lever 24 is positioned to strike the upper surface of the mounting panel 2 or other suitable abutment when the lever 6 is depressed without first moving the stop lever 24 against the force of the biasing spring 28. This prevents inadvertent operation of the lever 6 and, therefore, the operation of the member 20 to be actuated. On the other hand, when it is desired to operate the lever 6, the stop lever 24 is moved against the force of the biasing spring 28. This causes the lower end of the stop lever to be aligned with a hole 30 in the mounting panel 2. Thus aligned with the hole, the stop lever 24 no longer interferes with the operation of the lever 6 and may be depressed as shown in Fig. 2 to effect actuation of the member 20.

Thus there has been provided an improved control member of the push button type which is characterized in the provision of means for the prevention of inadvertent operation thereof and means to call the attention to the operator that the particular control or push button has been encountered.

What is claimed is:

1. A control means comprising a depressible push button control member presenting a surface for finger engagement, means for pivotally mounting said push button member, a stop lever pivotally mounted within said control member, said mounting means including an abutment, biasing means coupled to said stop lever for biasing one end of said stop lever into alignment with said abutment whereby to prevent the depression of said control member, said depressible control member having an opening ending in said surface, and a portion of said stop lever projecting through said opening in said surface and constituting means for moving said stop lever out of alignment with said abutment.

2. A control means as set forth in claim 1, wherein said portion of said stop lever projecting through said opening has a serrated surface.

3. Control means comprising a push button actuated member pivotally movable from an unoperated position to an operated position, stop means associated with said member normally operative to prevent the movement thereof comprising an element movable with said member, a fixed member arranged in the path of said element, means for biasing said element into engagement with said fixed member, and means for mounting said element on said push button member for movement independently of said movable member out of engagement with said fixed member to permit movement of said push button actuated movable member into operated position.

4. Control means comprising a push button actuated member, having an opening therein a fixed member, said actuated member being pivotally mounted on said fixed member for pivotal movement from an unoperated position to an operated position, stop means associated with said actuated member normally operative to prevent the movement thereof comprising an element movable with said actuated member, said fixed member being arranged in the path of said element and having an aperture therein, means for biasing said element into a position for engagement with said fixed member, means for mounting said element in said opening for selective movement independently of said actuated member into another position to permit entry of said element into said aperture on movement of said actuated member into operated position.

References Cited in the file of this patent

UNITED STATES PATENTS

| | | |
|---|---|---|
| 373,455 | Gould | Nov. 22, 1887 |
| 616,672 | Kelling | Dec. 27, 1898 |
| 1,024,139 | Miller | Apr. 23, 1912 |
| 1,432,789 | Richards | Oct. 24, 1922 |
| 2,211,216 | Oster | Aug. 13, 1940 |
| 2,319,472 | Plensler | May 18, 1943 |
| 2,514,212 | Jennings | July 4, 1950 |
| 2,566,859 | Seeler | Sept. 4, 1951 |

FOREIGN PATENTS

| | | |
|---|---|---|
| 663,492 | France | Apr. 9, 1929 |